Jan. 30, 1951     H. BOBROWSKI     2,539,689
UNDERSLUNG SELF-CONTAINED CONVEYER
Filed Sept. 5, 1947
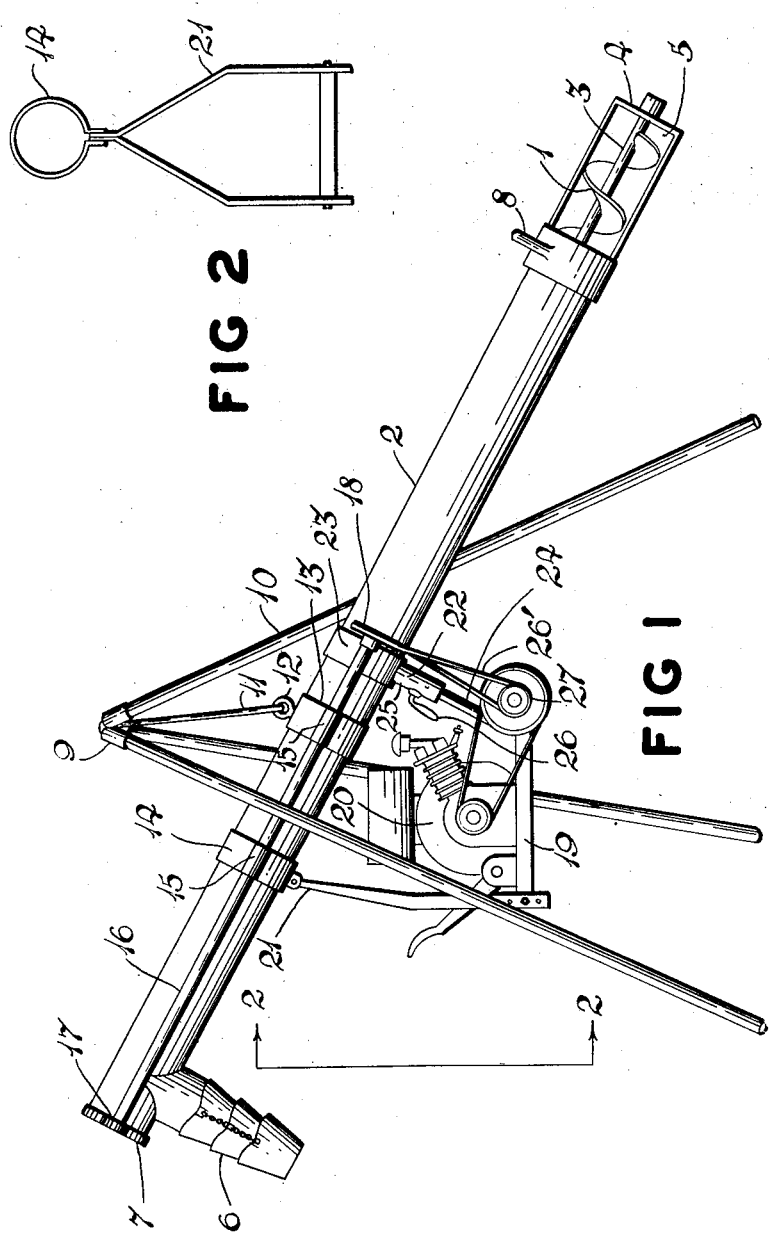
Inventor:
Henry Bobrowski
By: Suthershonhaugh & Co
his Atty's Patented Jan. 30, 1951

2,539,689

UNITED STATES PATENT OFFICE 2,539,689

UNDERSLUNG SELF-CONTAINED CONVEYER

Henry Bobrowski, Morris, Manitoba, Canada

Application September 5, 1947, Serial No. 772,431

4 Claims. (Cl. 198—120)

My invention relates to self-contained conveyors for the transference of comminuted, or more particularly granular materials such as grain from a wagon into a granary for example, or from a granary into a wagon, wherein the power-unit is underslung with respect to the conveyor per se, an object of the invention being to provide (as indicated by the expression "self-contained") a device which eliminates the use of a power-take-off from an associated truck, tractor or the like, whereby the conveyor or conveying unit may be usefully employed by farmers who do not own a truck or tractor but instead employ horses and wagons for transporting their grain.

A further object is to provide a conveyor in combination with an underslung power-unit and a tripod from which the conveyor and power-unit are suspended whereby the conveyor and the power-unit may be swivelled vertically and horizontally with conspicuous ease, being preferably suspended from a point at or adjacent to the centre of gravity so that neither end is resting heavily on the ground or on the truck.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which—

Figure 1 is a side elevation of my underslung self-contained conveyor.

Figure 2 is a fragmentary representation of my invention as viewed on the line 2—2 of Figure 1.

In the drawings like characters of reference indicate corresponding parts in the different figures.

My conveyor with which the inventive features herewithin described are combined is preferably but not necessarily of the auger type wherein a grain conveying screw 1 is positioned within a supporting structure in the form of an elongated tube or trunk 2, the shaft 3 of the auger or conveyor being journaled in spiders 4 or the like at the ends of the tube. The parts 1, 3 and 4 I elect to define in the claims appended hereto, collectively as a "conveying action." The lower end 5 of the conveyor is open in accordance with conventional practice for immersion into the mass of grain being transferred as from a granary or the like, while a conventional chute assembly 6 is located adjacent the opposite end, shaft 3 being operated by means of a gear 7. Numeral 8 designates a conventional handle for the manipulation of the conveyor.

The aforesaid components are suspended from the apex 9 of a tripod 10 by means of a hanger 11 provided with a hook which passes through the ring 12 secured to a trunk encircling band 13 located preferably a little to one side of the centre of gravity of the conveyor. Spaced from the band 13 is a secondary band 14, and in mutual alignment on each of the aforesaid bands is a bearing 15 within which a driveshaft 16 is journaled. The driveshaft 16 extends in parallel, spaced relationship to the trunk or tube 2, and upon one side thereof as clearly depicted, a drive gear 17 in mesh with gear 7 being keyed to the upper end of shaft 16 while a pulley 18 is keyed to the lower end.

Positioned in spaced relationship below the foregoing conveyor components is a platform 19 on which is mounted a conventional motor collectively designated 20. Structure is provided for supporting the aforesaid platform in the form of a pivoted hanger 21 attached to one end of platform 19 and the band 14, and a platform-level adjusting hanger 22 extending between the opposite end of platform 19 and being secured to a third trunk encircling band 23.

The pivoted hanger 21 is in the form of a yoke as clearly depicted in the accompanying Figure 2, while hanger 22 is telescopic, portion 24 being slideable within portion 25 and capable of being cramped at any desired point therein by the lever 26. Pulley 18 is rotated by means for operating my conveyor in the form of a belt 26' on the drive pulley 27 of motor 20.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In the art of granular or comminuted materials conveying, and in combination with an elongated bodily manipulable conveyor comprising a conveying action and a supporting structure therefor, an adjustable platform, a pivoted hanger in the form of a yoke connected to said conveyor and supporting one end of said platform, a telescopic hanger wherein the parts are held in clamped relationship connected to said conveyor and supporting the other end of said platform, a motor on said platform, and means for operating said conveyor from said motor.

2. In the art of granular or comminuted materials conveying, and in combination with an elongated bodily manipulable conveyor comprising a conveying action and a supporting structure therefor, an adjustable platform positioned in spaced relationship below said conveyor, a pivoted hanger in the form of a yoke connected to said conveyor and supporting one end of said platform, a telescopic hanger wherein the parts are held in clamped relationship connected to said conveyor and supporting the other end of said platform, a motor on said platform, a driveshaft journaled on said conveyor axially parallel therewith, and a drive connection between said motor and said shaft.

3. In the art of granular or comminuted materials conveying, and in combination with an elongated bodily manipulable conveyor comprising a conveying action and a supporting structure therefor, an adjustable platform in spaced relationship below said conveyor, a pivoted hanger in the form of a yoke connected to said conveyor and supporting one end of said platform, a telescopic hanger wherein the parts are held in clamped relationship connected to said conveyor and supporting the other end of said platform, a motor on said platform, a driveshaft journaled on said conveyor axially parallel therewith and positioned upon one side thereof, and a drive connection between said motor and said shaft, and a tripod for supporting all the foregoing above ground level.

4. The assembly according to claim 3 which includes a hanger connected pendant to the apex of said tripod, said conveyor being connected to the lower end of said tripod hanger, and being thereby suspended between two legs of said tripod.

HENRY BOBROWSKI.

REFERENCES CITED

The following references are of record in the file of this patent:

UNITED STATES PATENTS

| Number | Name | Date |
|---|---|---|
| 604,101 | Wilhelm et al. | May 17, 1898 |
| 2,202,882 | Wylie | June 4, 1940 |
| 2,332,729 | Klosterman | Oct. 26, 1943 |
| 2,353,094 | Veneziano | July 4, 1944 |
| 2,408,952 | Raney | Oct. 8, 1946 |
| 2,444,521 | Mulkey et al. | July 6, 1948 |
| 2,460,661 | Tintes | Feb. 1, 1949 |

FOREIGN PATENTS

| Number | Country | Date |
|---|---|---|
| 814,196 | France | June 17, 1937 |